United States Patent
Kume et al.

(10) Patent No.: US 7,671,913 B2
(45) Date of Patent: Mar. 2, 2010

(54) METHOD FOR CONVERTING IMAGE DATA, CONVERTING CIRCUIT FOR IMAGE, AND ELECTRONIC CAMERA

(75) Inventors: Tsutomu Kume, Ibaraki (JP); Tokuichiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 1453 days.

(21) Appl. No.: 10/520,770

(22) PCT Filed: Apr. 7, 2004

(86) PCT No.: PCT/JP2004/005028

§ 371 (c)(1),
(2), (4) Date: Jan. 10, 2005

(87) PCT Pub. No.: WO2004/100544

PCT Pub. Date: Nov. 18, 2004

(65) Prior Publication Data
US 2005/0237427 A1     Oct. 27, 2005

(30) Foreign Application Priority Data
May 12, 2003   (JP) .............................. 2003-132726

(51) Int. Cl.
*H04N 3/14*   (2006.01)
*H04N 11/20*  (2006.01)

(52) U.S. Cl. ........................ 348/305; 348/443; 348/441; 348/454

(58) Field of Classification Search ................. 348/305, 348/443, 459, 446, 454
See application file for complete search history.

(56) References Cited

U.S. PATENT DOCUMENTS

| 5,185,663 | A   |   | 2/1993 | Hackett |
| 6,778,221 | B1  | * | 8/2004 | Nishioka et al. ............ 348/459 |
| 6,876,395 | B1  | * | 4/2005 | Muto et al. ................. 348/441 |
| 7,012,648 | B2  | * | 3/2006 | Kondo et al. ................ 348/441 |

(Continued)

FOREIGN PATENT DOCUMENTS

JP          4-78284         3/1992

(Continued)

*Primary Examiner*—Luong T Nguyen
(74) *Attorney, Agent, or Firm*—Frommer Lawrence & Haug LLP; William S. Frommer; Ellen Marcie Emas (57) ABSTRACT

A circuit for converting the format of image data, the motion of the image data being smooth, includes a memory (16) to which moving image data in the NTSC format is written; a memory controller (14) retrieving respective signals, from the memory (16), required for producing image data of an odd field and an even field in the PAL format; line-interpolating circuits (73) and (74) converting retrieved image data into first image data and second image, respectively, both image data having the line frequency of the PAL format; a frame-interpolating circuit (75) outputting the image data of the odd field in the PAL format by mixing image data of the odd field of the first image data and image data of the odd field of the second image data at a predetermined mixing ratio, and outputting the image data of the even field in the PAL format by mixing image data of the even field of the first image data and image data of the even field of the second image data at a predetermined mixing ratio; and a coefficient-generating circuit (77) changing the mixing ratios every field period in the PAL format.

8 Claims, 10 Drawing Sheets

U.S. PATENT DOCUMENTS

| | | | |
|---|---|---|---|
| 7,250,979 B2 * | 7/2007 | Choi | 348/441 |
| 2006/0256236 A1 * | 11/2006 | Kume et al. | 348/441 |

FOREIGN PATENT DOCUMENTS

| | | |
|---|---|---|
| JP | 2508419 | 4/1996 |
| JP | 2001-313896 | 11/2001 |
| JP | 2002-369155 | 12/2002 |

* cited by examiner

| | NTSC | PAL |
|---|---|---|
| NUMBER OF HORIZONTAL LINES | 525 LINES | 625 LINES |
| NUMBER OF EFFECTIVE LINES | ABOUT 480 LINES | ABOUT 576 LINES |
| HORIZONTAL FREQUENCY fh | 4.5MHz／286 ≒ 15.734 kHz | 4.5MHz／288 = 15.625 kHz |
| FRAME FREQUENCY | fh／525 ≒ 29.97Hz | fh／625 = 25Hz |
| FIELD FREQUENCY | 2fh／525 ≒ 59.94Hz | 2fh／625 = 50Hz |

FRAME FREQUENCY OF NTSC FORMAT : FRAME FREQUENCY OF PAL FORMAT $$= \frac{4.5 \text{MHz}}{286} \div 525 : \frac{4.5 \text{MHz}}{288} \div 625$$

$$= 1200 : 1001$$

$$\cong 6 : 5$$

NUMBER OF EFFECTIVE LINES OF NTSC FORMAT : NUMBER OF EFFECTIVE LINES OF PAL FORMAT $$\cong 480 \text{ LINES} : 576 \text{ LINES}$$

METHOD FOR CONVERTING IMAGE DATA, CONVERTING CIRCUIT FOR IMAGE, AND ELECTRONIC CAMERA

TECHNICAL FIELD

The present invention relates to electronic cameras that capture and play back moving images, and in particular, relates to methods for converting image data in the National Television System Committee (NTSC) format into those in the Phase Alternation by Line (PAL) format.

BACKGROUND ART

Many digital still cameras include liquid crystal display (LCD) monitors for checking images to be captured and captured images. In addition, many digital still cameras include video output terminals and can display images on, for example, external television receivers.

One type of digital still camera can capture moving images in addition to still images. In most cases, these digital still cameras capture moving images in video graphics array (VGA) size, i.e., 640 dots in width and 480 dots in height, in the NTSC format in consideration of viewing on personal computers (See Japanese Unexamined Patent Application Publication Nos. 5-122663, 8-172609, and 2001-313896, for example).

Figure 7A:
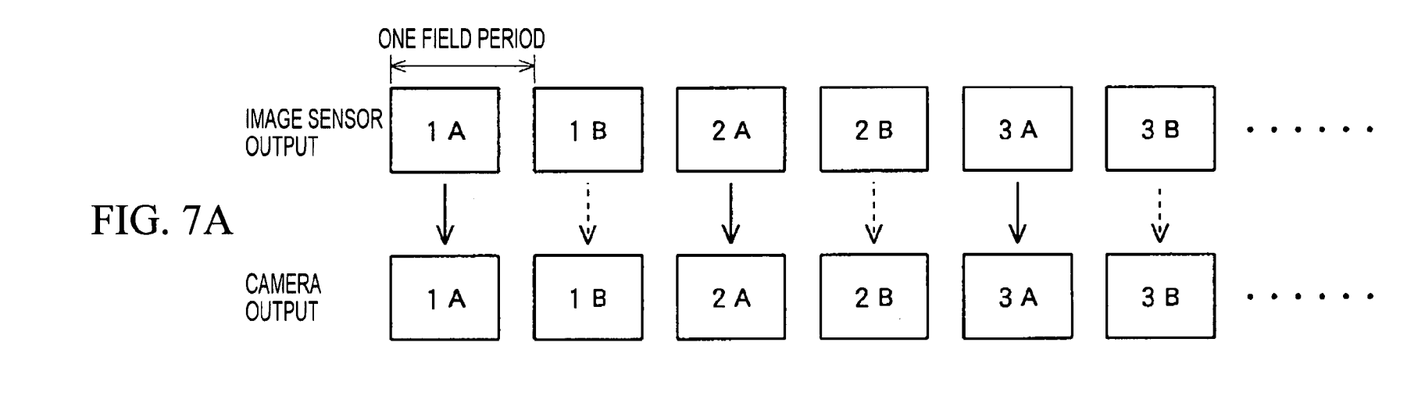
FIGS. 7A and 7B illustrate the conventional output of image data.

In a video camera, i.e., a television camera, a charge coupled device (CCD) image sensor captures an image and outputs image data once every field period, as shown in the upper side of FIG. 7A. The image data is then processed and output from the camera as video signals once every field period in series, as shown in the lower side of FIG. 7A.

Figure 7B:
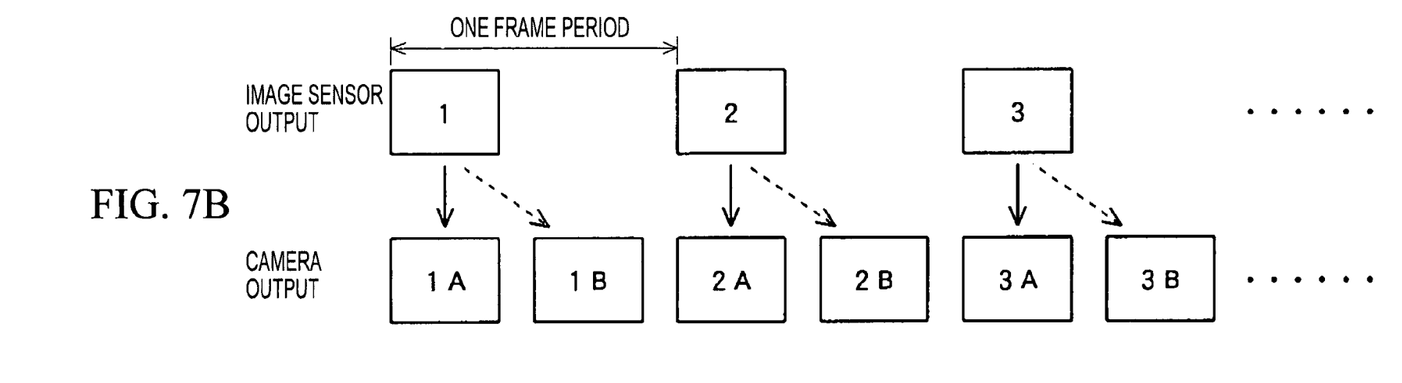

In FIGS. 7A and 7B, numerals 1, 2, 3, ... are serial numbers respectively assigned to certain consecutive frames. A symbol having a numeral with a suffix A indicates the odd field in a frame indicated by the numeral, and a symbol having a numeral with a suffix B indicates the even field in a frame indicated by the numeral. Solid arrows indicate image data flows of odd fields, and dotted arrows indicate image data flows of even fields. Hereinafter, the same rules are followed in other drawings.

On the other hand, a digital still camera mainly captures still images and is suitably designed for capturing still images. Thus, in a digital still camera, a CCD image sensor captures an image and outputs image data once every frame period, as shown in the upper side of FIG. 7B. The image data per frame is split into a first image data component of the odd field, as indicated by a solid arrow, and a second image data component of the even field, as indicated by a dotted arrow. These image data components are output from the camera as video signals once every field period in series, as shown in the lower side of FIG. 7B.

The above capturing and outputting techniques are also used for capturing moving images. Thus, when a digital still camera captures moving images, the motion of the images is jerky because the interval of capturing images in a digital still camera is twice that in a video camera.

Figure 8:
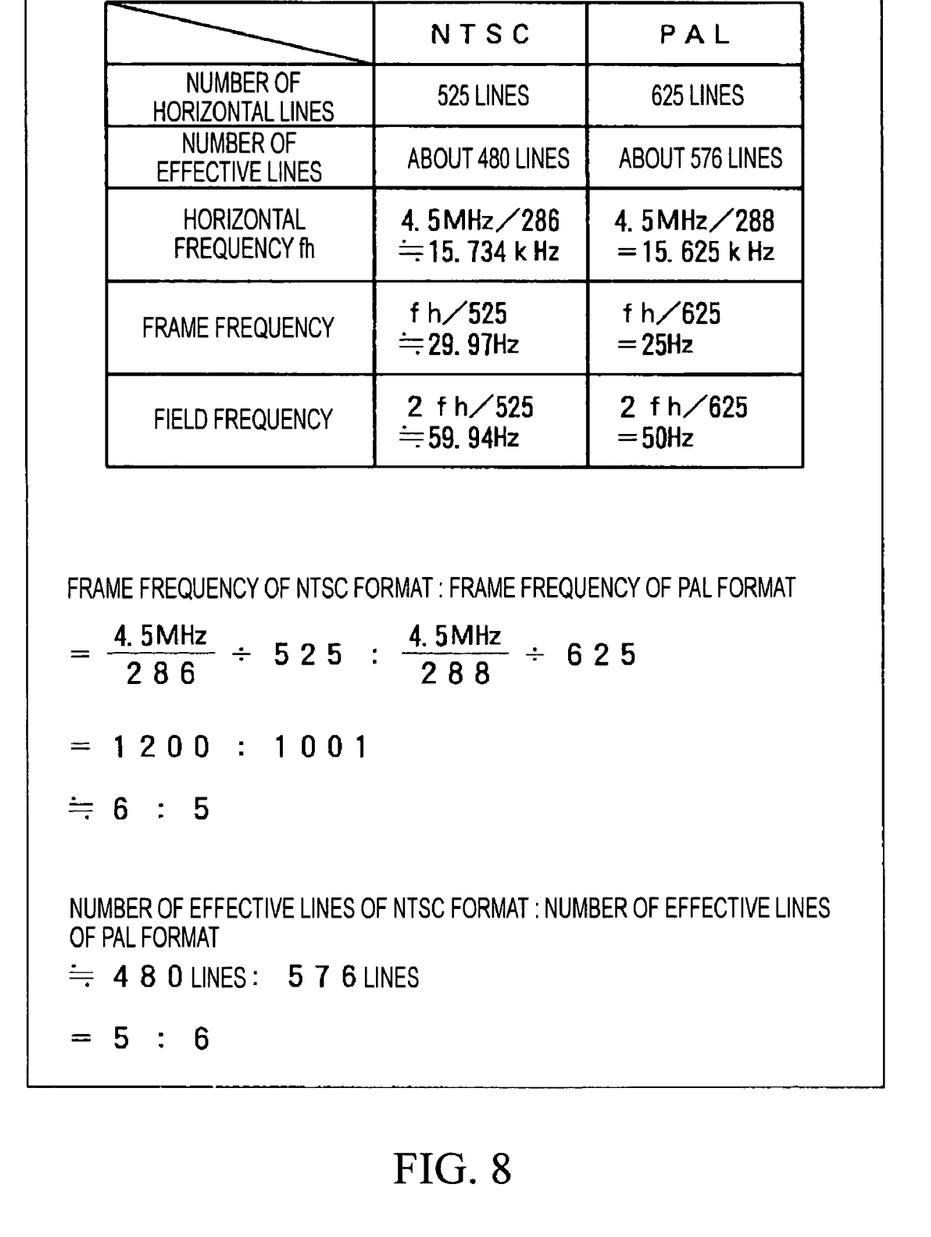
FIG. 8 illustrates the synchronizing frequencies of NTSC and PAL format.

FIG. 8 shows synchronizing frequencies of the NTSC format and the PAL format and the frequency ratio. Thus, when moving images are captured (or are captured, recorded, and played back) in the NTSC format, both frames and lines of image data in the NTSC format need to be converted into those in the PAL format for viewing on a PAL television receiver.

Figure 9:
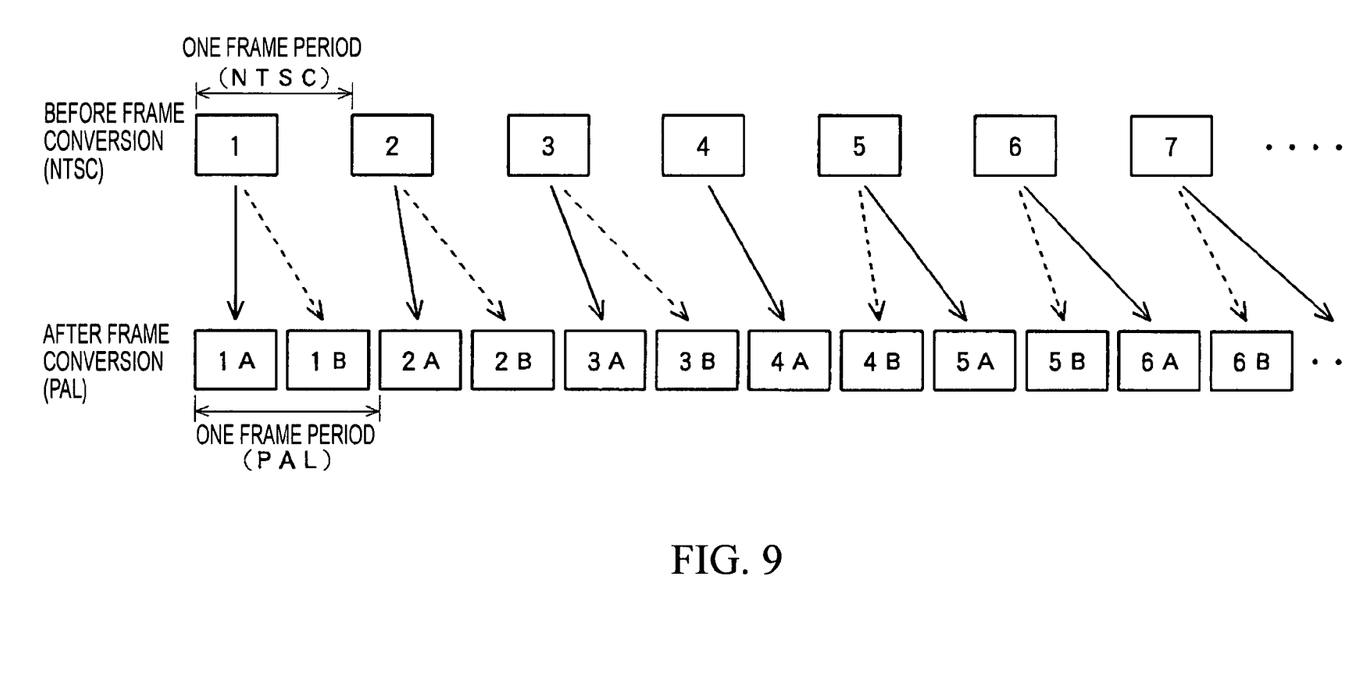
FIG. 9 illustrates the conventional technique to convert NTSC to PAL.
Figure 10:
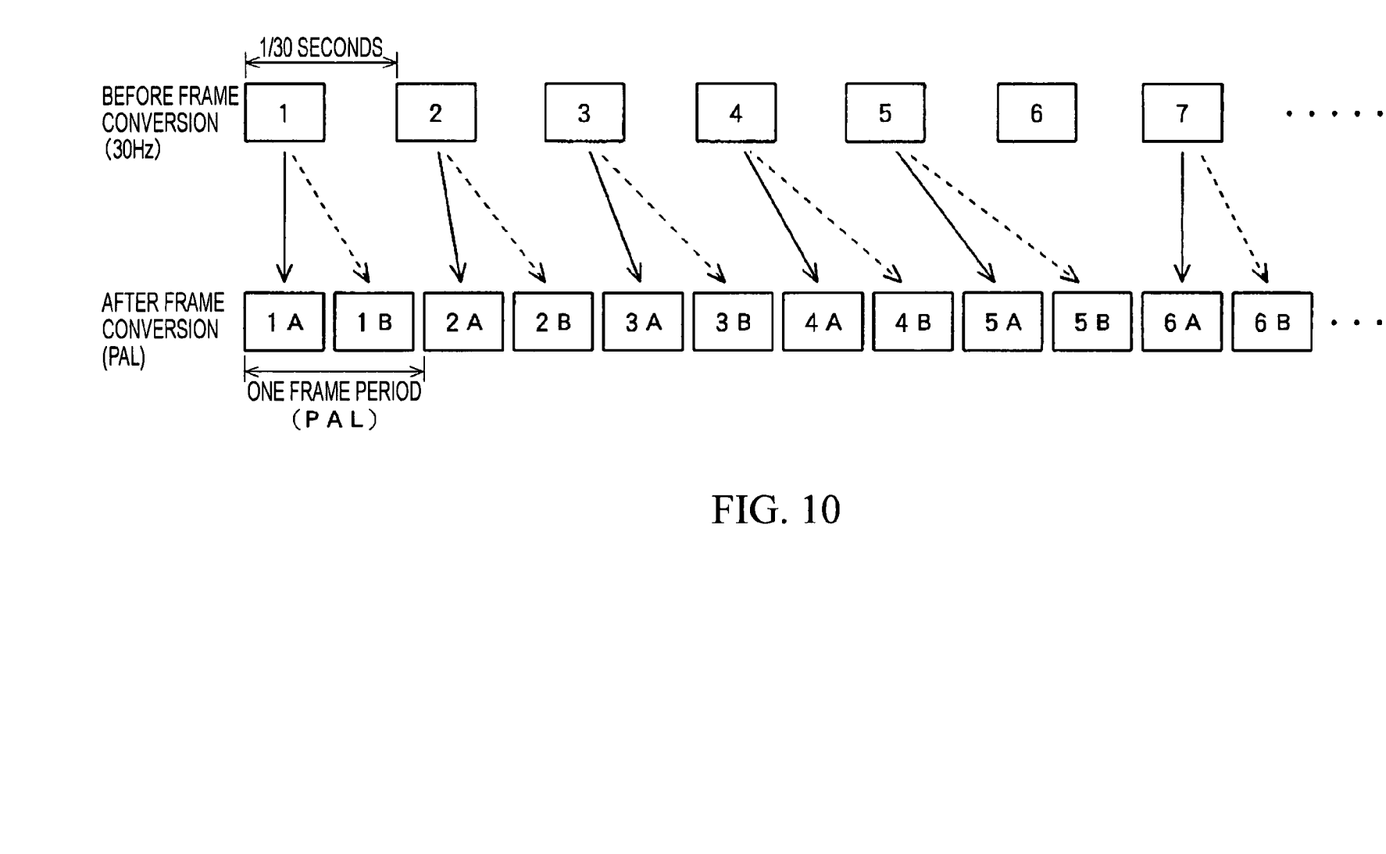
FIG. 10 illustrates the conventional technique to convert NTSC to PAL.

FIGS. 9 and 10 illustrate typical techniques for converting frames. The upper sides of FIGS. 9 and 10 show image data before frame conversion. This image data corresponds to, for example, image data that is output from a CCD image sensor or recorded. The lower sides of FIGS. 9 and 10 show image data in the PAL format after frame conversion. This image data corresponds to, for example, video signals output from a camera to an external television receiver or video signals supplied to a built-in LCD monitor.

In the case of FIG. 9, a first frame to a third frame in the NTSC format are respectively used for a first frame to a third frame in the PAL format. The odd field in a fourth frame in the NTSC format is used as the odd field 4A in a fourth frame in the PAL format, and the even field is decimated. A fifth frame in the NTSC format is used for the even field 4B in the fourth frame in the PAL format and the odd field 5A in a fifth frame in the PAL format.

After some fields in the NTSC format are decimated, residual fields in the NTSC format are converted into those in the PAL format so that the ratio of frame frequency of the NTSC format to that of the PAL format is eventually 1,200:1,001.

When every 1,200 frames of image data in the NTSC format are decimated to 1,001 frames, the sequence of the decimation is complicated because the location of the field to be decimated shifts as time elapses. Thus, when the decimation is carried out under the control of a central processing unit (CPU), there is a considerable software load.

Thus, the following technique shown in FIG. 10 has been conceived: Each frame of image data is retrieved from, for example, a CCD image sensor or a recording medium every 1/30 seconds, and is converted into that in the PAL format. In this case, the ratio of frame frequency of the input image data to that of the PAL format is as follows:

30 Hz:25 Hz=6:5

Accordingly, as shown in FIG. 10, image data in the PAL format can be obtained by decimating one frame in the NTSC format every six frames, thereby enabling an easy frame conversion.

However, in this frame conversion technique, information for one frame period every six frame periods in the NTSC format is dropped out. Thus, a discontinuous point occurs every five frames in the PAL format, which prevents smooth playback. When a digital still camera captures moving images, the motion of the moving images is jerky as compared with that in a video camera, as described above. Hence, when frames of these moving images are converted with the technique shown in FIG. 10, the motion of the moving images is jerkier. Moreover, in some cases, an LCD monitor of a digital still camera cannot adapt to the 60 Hz synchronizing frequency system and cannot display images.

As shown in FIG. 8, the number of horizontal lines of the NTSC format is different from that of the PAL format. When frames of the NTSC format are converted into those of the PAL format, the number of horizontal lines also needs to be converted. Thus, when image data in the NTSC format is converted into image data in the PAL format, both frame conversion and line conversion are carried out. When these conversions are not suitably carried out, the whole converted image data lags behind by several frame periods. Some portion of memory is required for these several frame periods.

The present invention is intended to solve the above problems.

DISCLOSURE OF INVENTION

The present invention provides a method for converting image data in a first format into image data in a second format.

The image data in the first format has a first frame frequency and a first line frequency. The image data in the second format has a second frame frequency and a second line frequency. The method includes the steps of: retrieving respective signals required for producing image data of an odd field and an even field in the second format, out of moving image data in the first format from a memory to which the moving image data in the first format is written, every odd field period and every even field period in the second format, respectively; converting the retrieved image data into first image data and second image data, both image data having the second line frequency; outputting the image data of the odd field in the second format by mixing image data of an odd field of the first image data and image data of an odd field of the second image data at a predetermined mixing ratio; outputting the image data of the even field in the second format by mixing image data of an even field of the first image data and image data of an even field of the second image data at a predetermined mixing ratio; and changing the mixing ratios every field period in the second format.

Thus, the image data in the first format is converted to the image data in the second format by interpolation.

BRIEF DESCRIPTION OF THE DRAWINGS

FIG. 2 illustrates the present invention.

FIG. 3 illustrates the present invention.

FIG. 4 illustrates the present invention.

BEST MODE FOR CARRYING OUT THE INVENTION (1) Digital Still Camera

Figure 1:
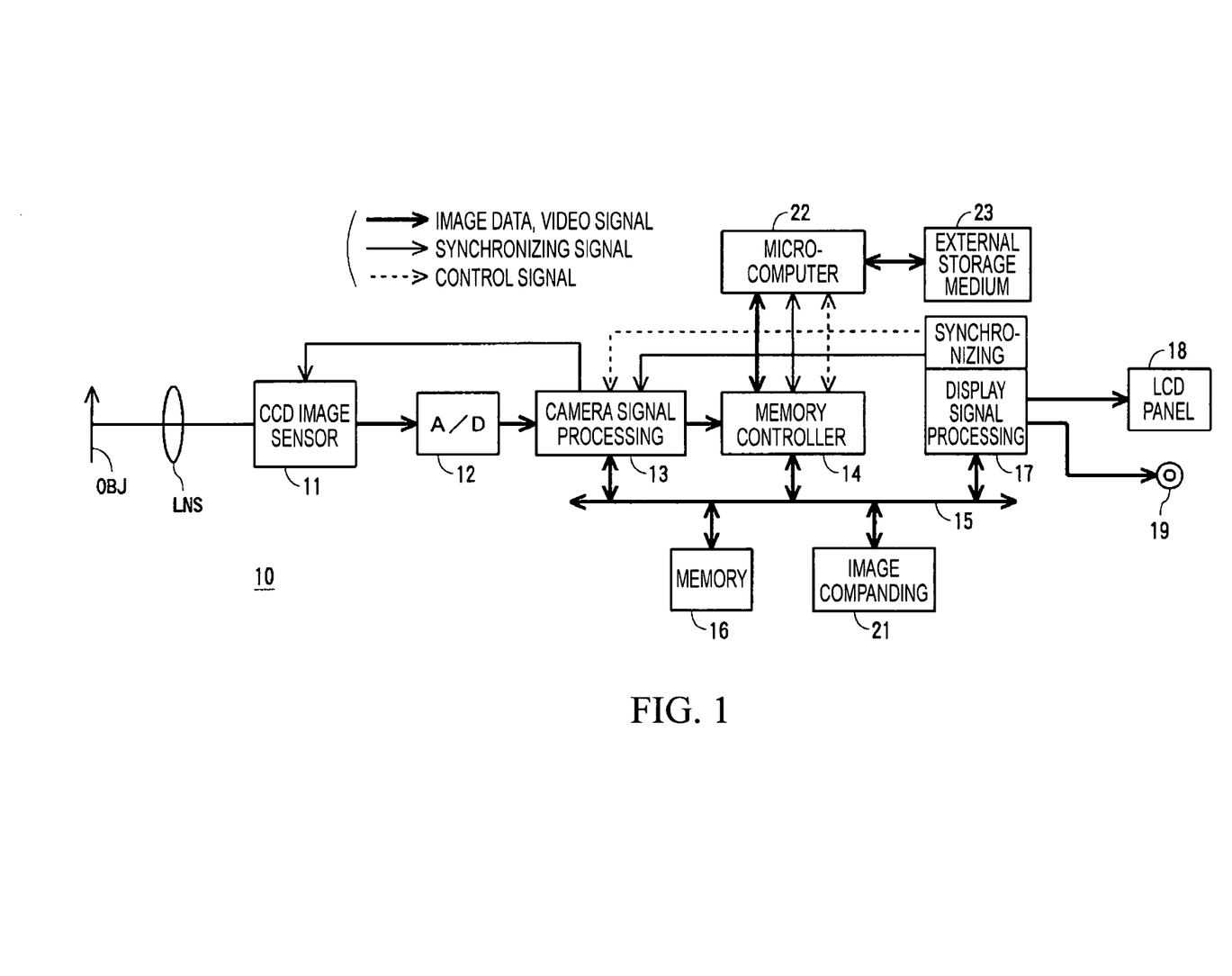
FIG. 1 is a schematic diagram illustrating an embodiment according to the present invention.

FIG. 1 illustrates a typical digital still camera 10 according to the present invention. An image of an object OBJ is projected onto a CCD image sensor 11 through an imaging lens LNS. Three-primary-color image signals of the object OBJ are output from the CCD image sensor 11 every frame period of the NTSC format. These image signals are supplied to an analog-to-digital (A/D) converter circuit 12 and are A/D-converted to digital image data.

The image data is supplied to a camera signal-processing circuit 13, and is converted to image data in the Y-signal, U-signal, and V-signal (YUV) format after processes, for example, white balance correction and gamma correction. The converted image data is written to an area for display in a memory 16 by a memory controller 14 through an image bus 15. The area for display in the memory 16 functions as a so-called video random access memory (RAM). Addresses of the area respectively correspond to dot positions on a display screen.

The image data is read from the area for display in the memory 16 by the memory controller 14 in parallel with writing to the memory 16. The read image data is supplied to a display signal-processing circuit 17 through the image bus 15, and is converted to image data in the red, green, and blue (RGB) format while being D/A-converted to analog image signals. These analog image signals are supplied to an LCD panel 18 and are displayed as color images. In the display signal-processing circuit 17, color video signals in addition to the analog image signals are simultaneously produced. These video signals are output to an external video output terminal 19 to be supplied to a monitoring television receiver (not shown in the drawing).

The image data in the area for display in the memory 16 is also supplied to an image-companding circuit 21 by the memory controller 14 through the image bus 15 and is compressed into code data in a predetermined format, for example, the Joint Photographic Experts Group (JPEG) format. This code data is written to a work area in the memory 16 through the image bus 15. The code data written to the work area in the memory 16 is read by the memory controller 14. This read code data is written to and stored in an external storage medium 23, such as a Memory Stick (trademark registered), by a microcomputer 22.

In a playback mode, the code data is read from the external storage medium 23 by the microcomputer 22 and is written to the work area in the memory 16. This written code data is decompressed into the original image data by the image-companding circuit 21. This decompressed image data is written to the area for display in the memory 16. This written image data is processed by the display signal-processing circuit 17 to be displayed on the LCD panel 18 as color images and to be output to the external video output terminal 19 as color video signals, as described above.

To smooth moving images displayed on the LCD panel 18 and moving images of color video signals output to the external video output terminal 19 when these moving images are captured and played back, the following signal processing is carried out in the present invention.

In the following description, image data before frame conversion, such as the output of the CCD image sensor 11, is called original image data, and image data and video signals after frame conversion, such as video signals output from the digital still camera 10, are respectively called output image data and output video signals.

(2) Capturing and Playing Back Moving Images

Figure 2:
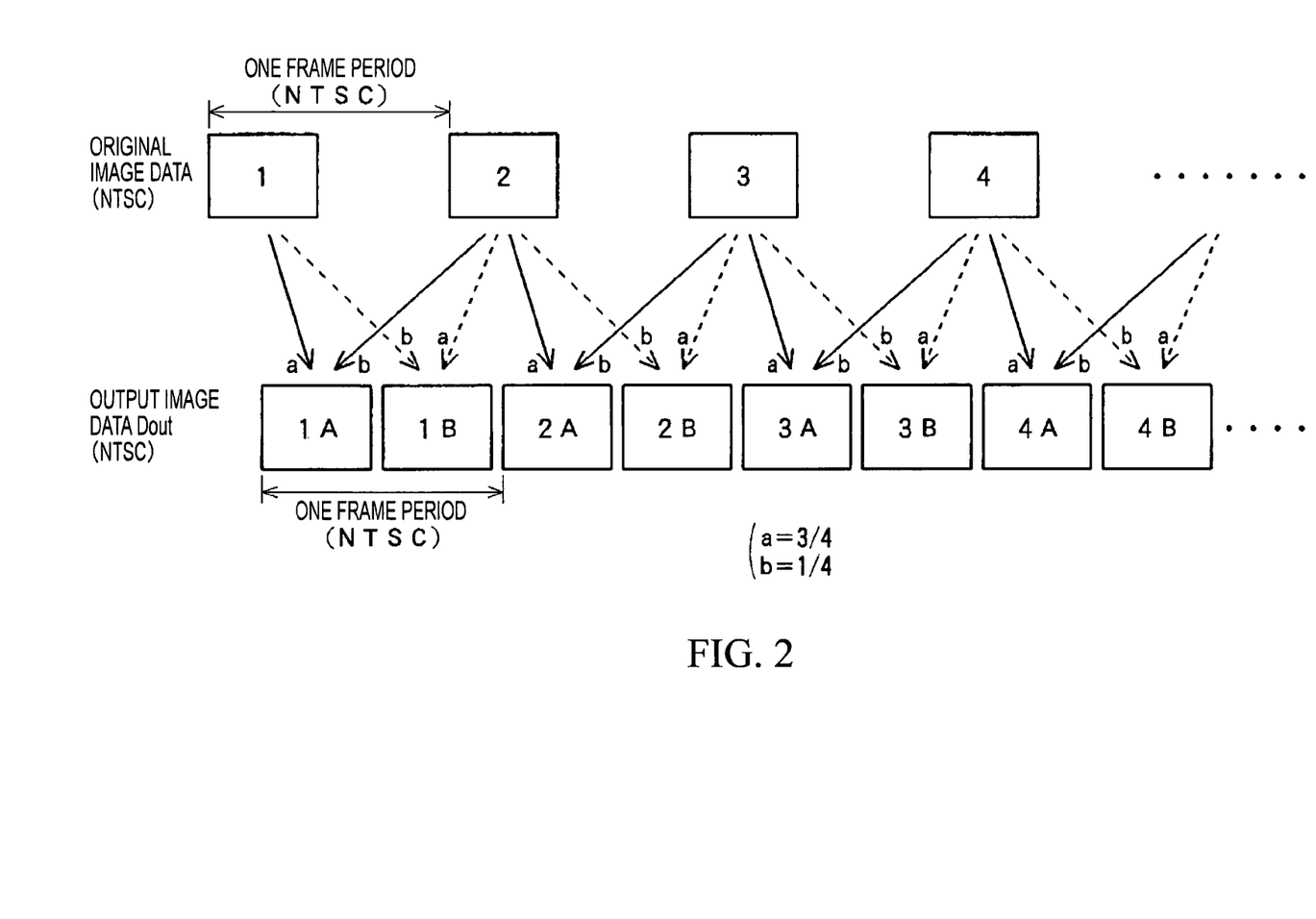

As shown in the upper side of FIG. 2, when moving images are captured, the CCD image sensor 11 is controlled so as to capture an image in the NTSC format and to output image data, i.e., original image data once every frame period. Thus, moving images stored in the external storage medium 23 and moving images read out are in the NTSC format and are based on units of frames.

According to the format of video signals, i.e., output video signals, supplied to, for example, the LCD panel 18 or the external video output terminal 19, frame conversion and line conversion are carried out as follows:

(2-1) Outputting Video Signals in the NTSC Format

As shown in the upper side of FIG. 2, original image data is obtained in units of frames of the NTSC format. In this case, the original image data is output in the form of video signals in the NTSC format. Thus, the frame frequency and the line frequency of the output video signals are the same as those of the original image data.

Accordingly, in this case, line conversion is not carried out, but frame conversion shown in FIG. 2 is carried out to improve the jerkiness of the moving images. The output image data DOUT is a signal component represented by the following expression, as shown in FIG. 2:

$$DOUT = (1-KF)D_n + KF \cdot D_{n+1} \quad (1)$$

where

DOUT is output image data and output video signals after frame conversion, $D_n$ is image data of the odd field or the even field in the n-th frame in the original image data, $D_{n+1}$ is image data of the odd field or the even field in the (n+1)-th frame in the original image data, and KF is a predetermined coefficient ($0 \leq KF \leq 1$).

When the output image data DOUT is that of the odd field, the original image data $D_n$ and $D_{n+1}$ are image data of the odd fields. When the output image data DOUT is that of the even field, the original image data $D_n$ and $D_{n+1}$ are image data of the even fields. According to the field of the output image data DOUT, the coefficient KF is changed, for example, as follows:

KF=¼ for the odd field of the output image data DOUT, or

KF=¾ for the even field of the output image data DOUT.

That is, fields of two continuous frames of the original image data are mixed at a predetermined ratio that changes every field period to form the output image data (the output video signals).

In this way, even when the original image data is formed every frame period, intermediate image data is formed by interpolation every field period. Displaying based on this formed image data improves the jerkiness of the moving images.

(2-2) Outputting Video Signals in the PAL Format

In this case, both the frame frequency and the line frequency of the original image data are different from those of the output image data. Thus, both frame conversion and line conversion are carried out. As described below, lines of the original image data are converted, and frames of this image data after line conversion are then converted to obtain the output image data.

(2-2-1) Line Conversion

Figure 3:
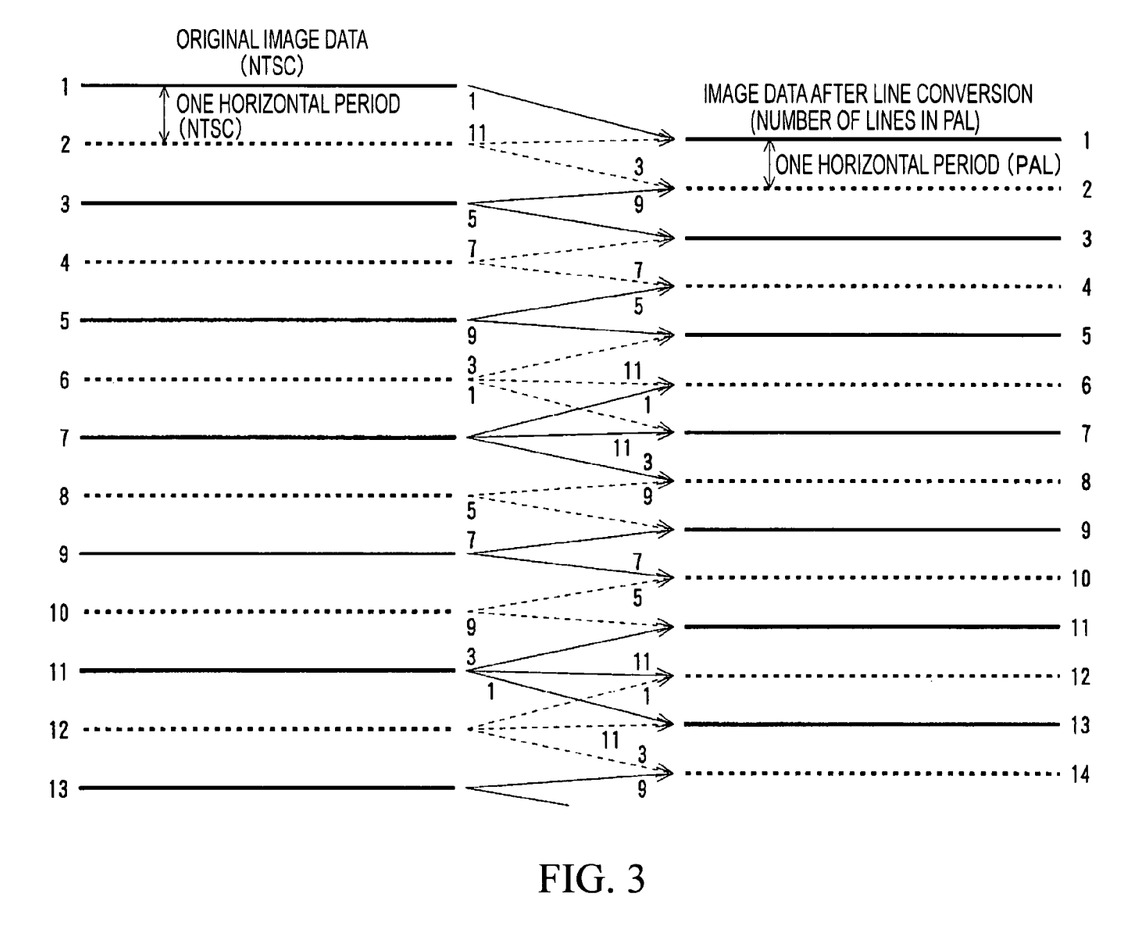

As shown in FIG. 8, the ratio of the number of effective lines of the NTSC format to that of the PAL format is 5:6. Thus, five lines of the original image data are converted to six lines in the PAL format. For example, this line conversion is carried out by interpolation in the vertical direction, as shown in FIG. 3. FIG. 3 shows the original image data and the image data after line conversion in units of horizontal lines. As shown in the left side of FIG. 3, the original image data has the horizontal line period of the NTSC format. The number assigned to each line indicates the line number in each frame period. Solid lines indicate horizontal lines of the odd field, and dotted lines indicate horizontal lines of the even field.

The processes are as follows:

(A) As shown in the right side of FIG. 3, the first line and the second line of the original image data are mixed in a ratio of 1:11 to generate the first line after line conversion, that is, the first line of the odd field after conversion.

(B) As shown in the right side of FIG. 3, the second line and the third line of the original image data are mixed in a ratio of 3:9 to generate the second line after line conversion, that is, the first line of the even field after conversion.

(C) The third line and the fourth line of the original image data are mixed in a ratio of 5:7 to generate the third line after line conversion, that is, the second line of the odd field after conversion.

(D) The fourth line and the fifth line of the original image data are mixed in a ratio of 7:5 to generate the fourth line after line conversion, that is, the second line of the even field after conversion.

(E) The fifth line and the sixth line of the original image data are mixed in a ratio of 9:3 to generate the fifth line after line conversion, that is, the third line of the odd field after conversion.

(F) The sixth line and the seventh line of the original image data are mixed in a ratio of 11:1 to generate the sixth line after line conversion, that is, the third line of the even field after conversion.

The same processes (A) to (F) are repeated every five lines of the original image data.

The image data dOUT after line conversion is a signal component represented by the following expression, as shown in FIG. 3:

$$dOUT = (1-KL)d_m + KL \cdot d_{m+1} \quad (2)$$

where dOUT is output image data after line conversion, $d_m$ is image data of the m-th line in the original image data, $d_{m+1}$ is image data of the (m+1)-th line in the original image data, and KL is a predetermined coefficient ($0 \leq KL \leq 1$).

The coefficient KL changes cyclically to be 11/12, 7/12, and 3/12 in this order when the field of the image data dOUT after conversion is the odd field, and the coefficient KL changes cyclically to be 9/12, 5/12, and 1/12 in this order when the field of the image data dOUT after conversion is the even field.

That is, two continuous lines of the original image data that are closest to a certain line of the converted image data dOUT in the chronological sequence of the conversion process are mixed at a predetermined ratio that changes every horizontal line period of the converted image data to form image data having as many lines as in the PAL format.

In this way, image data having 576 effective lines in the PAL format can be generated from the original image data having 480 effective lines by interpolating image data of an intermediate line between two continuous lines of the original image data.

(2-2-2) Frame Conversion

Figure 4:
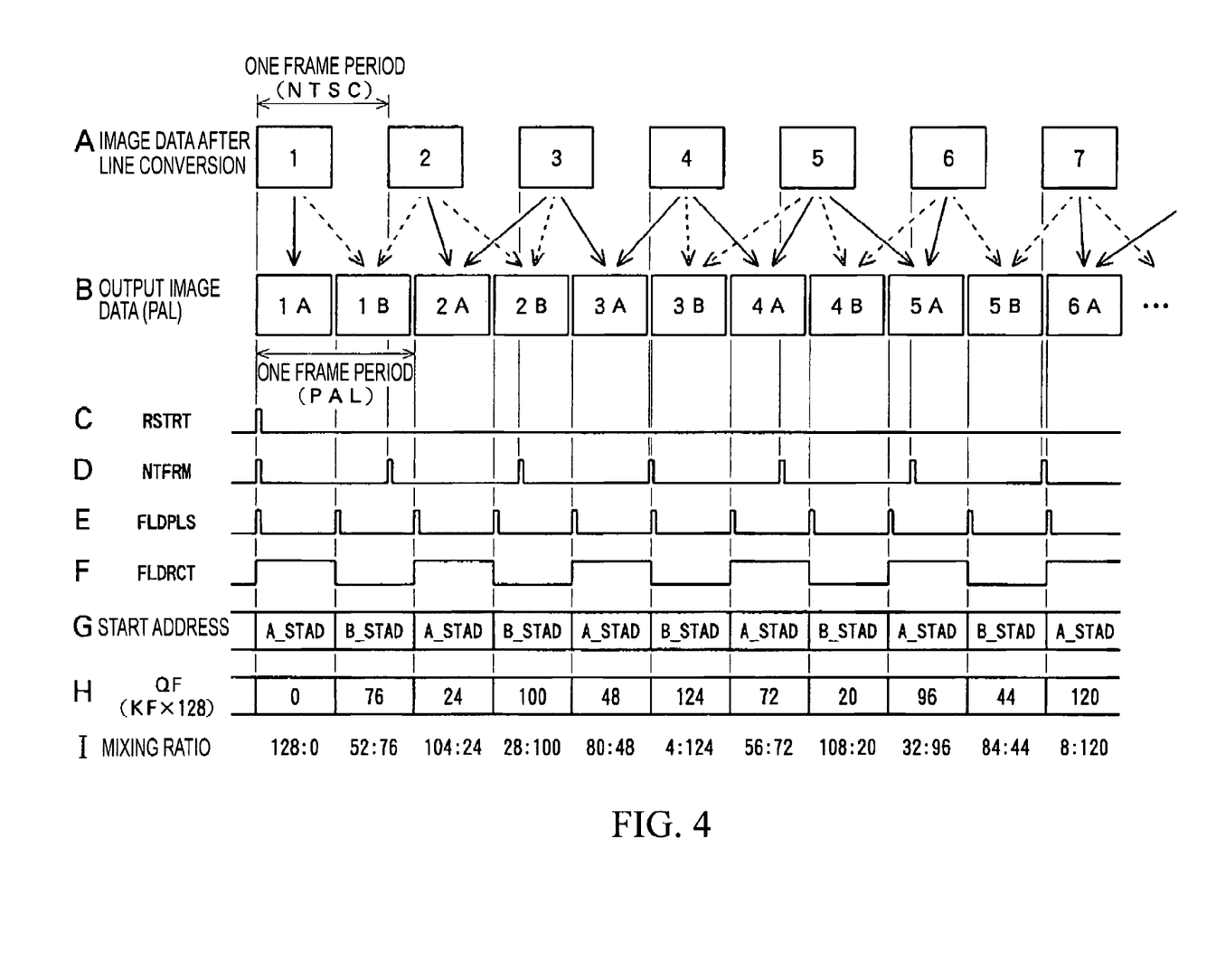

This frame conversion converts the image data after line conversion according to expression (2) into output image data in the PAL format by interpolation, as shown in parts A and B of FIG. 4. Part A of FIG. 4 shows the image data after line conversion according to expression (2) in units of frames, and part B of FIG. 4 shows the output image data after frame conversion in units of frames.

That is, this frame conversion generates output image data DOUT according to expression (1). In this case, image data $D_n$ and $D_{n+1}$ are respectively the image data DOUT ($=D_n$) and DOUT ($=D_{n+1}$), each for one field, after line conversion according to expression (2). The coefficient KF changes by a predetermined amount every field period of the output image data DOUT according to the shift between the image data after line conversion and the output image data DOUT.

That is, image data (image data after line conversion) of two continuous fields that are closest to the image data DOUT after frame conversion in the chronological sequence of the conversion process are mixed at a predetermined ratio that changes according to the shift between the image data after line conversion and the image data after frame conversion every field period to obtain the image data in the PAL format.

Thus, image data of each field in the PAL format is generated from the image data after line conversion having the NTSC frame period by interpolation. Displaying based on this image data after frame conversion improves the jerkiness of the moving images.

(3) Circuit Producing Output Image Data from Original Image Data

Figure 5:
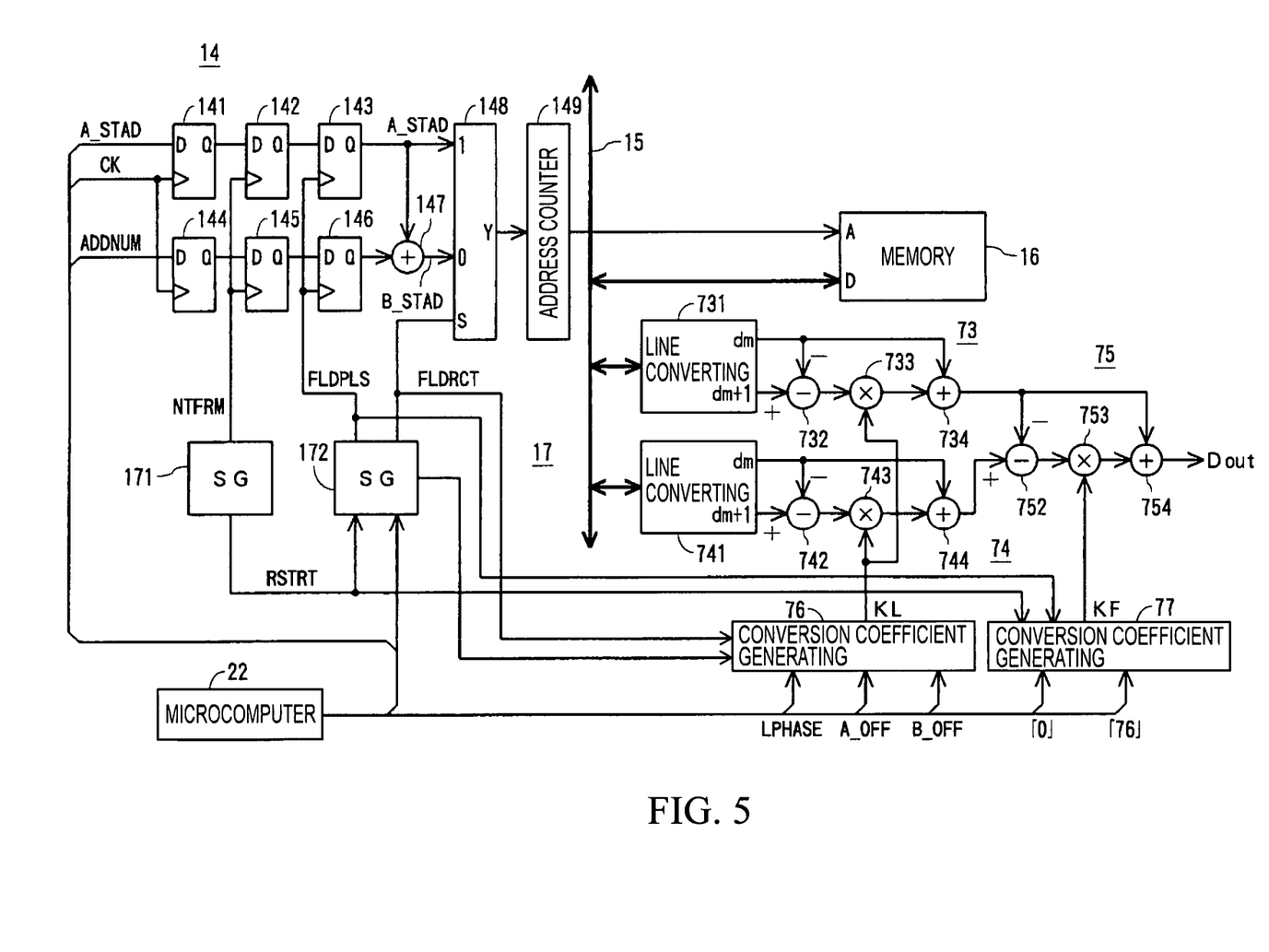
FIG. 5 is a schematic diagram illustrating a part of the present invention.

Lines and frames of the original image data are converted to those of the output image data (the output video signals) mainly by, for example, the memory controller 14 and the display signal-processing circuit 17, as shown in FIG. 5. In the main, the case of the output image data in the PAL format will now be described. The original image data is written to the memory 16 in a bit map corresponding to a display screen. The original image data is then read out from addresses corresponding to respective horizontal scanning positions.

As shown in FIG. 8, the total length of 1,200 frame periods of the NTSC format is the same as that of 1,001 frame periods of the PAL format. The NTSC frame is synchronized with the PAL frame once every total length.

The display signal-processing circuit 17 includes signal-generating circuits 171 and 172 that generate various types of timing signals. The signal-generating circuit 171 outputs a pulse NTFRM every NTSC frame period, as shown in part D of FIG. 4, as well as a pulse RSTRT every 1,200 NTSC frames, as shown in part C of FIG. 4.

The signal-generating circuit 172 outputs a pulse FLDPLS and a rectangular-wave signal FLDRCT, respectively shown in part E and part F of FIG. 4, every NTSC field period or PAL field period. The microcomputer 22 supplies predetermined control signals to the signal-generating circuit 172 to set the period of the pulses FLDPLS and the period of the signals FLDRCT to the NTSC field period or the PAL field period. The signal-generating circuit 171 supplies the pulses RSTRT to the signal-generating circuit 172.

Since the original image data is read out from addresses of the memory 16, corresponding to respective horizontal scanning positions, the memory controller 14 includes a group of registers (latch circuits) 141 to 143, a group of registers (latch circuits) 144 to 146, an address counter 149, and the like.

The registers 141 to 143 store an odd-field start address A_STAD (the start address of the first odd line), and the registers 144 to 146 store data ADDNUM indicating the number of addresses (the number of pixels) per line. The count value of the address counter 149 is used as a readout address of the memory 16. The readout address (the count value) changes every time a predetermined clock is counted, starting from the start address.

When the microcomputer 22 supplies the odd-field start address A_STAD and a clock CK to the register 141, which stores the start address A_STAD. An output from the register 141 and the pulses NTFRM from the signal-generating circuit 171 are supplied to the register 142, which stores the odd-field start address A_STAD. An output from the register 142 and the pulses FLDPLS from the signal-generating circuit 172 are supplied to the register 143, which outputs the odd-field start address A_STAD every pulse FLDPLS.

Similarly, the microcomputer 22 supplies the data ADDNUM indicating the number of addresses per line to the register 144, and the data ADDNUM is output from the register 146.

An adding circuit 147 adds the odd-field start address A_STAD from the register 143 to the data ADDNUM, indicating the number of addresses per line, from the register 146, and outputs an even-field start address B_STAD (the start address of the first even line).

The odd-field start address A_STAD, the even-field start address B_STAD, and the signals FLDRCT serving as control signals output from the signal-generating circuit 172 are supplied to a data selector 148 (in this case, the signals FLDRCT invert every PAL field period). Thus, as shown in part G of FIG. 4, the data selector 148 alternately outputs the odd-field start address A_STAD and the even-field start address B_STAD every PAL field period.

These start addresses output from the data selector 148 are supplied to the address counter 149, and the count value of the address counter 149 is supplied to the memory 16 as a readout address. Thus, the original image data is retrieved from the memory 16 every PAL field period.

The retrieved original image data is alternately supplied to each of a pair of line-interpolating circuits 73 and 74 provided in the display signal-processing circuit 17 every frame period. The line-interpolating circuits 73 and 74 convert lines of the original image data by interpolation according to expression (2). The line-interpolating circuit 73 includes a converting circuit 731 and arithmetic circuits (a subtracting circuit 732, a multiplying circuit 733, and an adding circuit 734). The line-interpolating circuit 74 includes a converting circuit 741 and arithmetic circuits (a subtracting circuit 742, a multiplying circuit 743, and an adding circuit 744).

The converting circuit 731 includes a buffer memory (not shown in the drawing), and synchronously outputs image data $d_m$ of the m-th line and image data $d_{m+1}$ of the (m+1)-th line in the n-th frame, out of the original image data read out from the memory 16.

These synchronized image data $d_m$ and $d_{m+1}$ are supplied to the subtracting circuit 732, which subtracts the data $d_m$ from the data $d_{m+1}$ and supplies the result ($d_{m+1}-d_m$) to the multiplying circuit 733. The coefficient KL is also supplied to the multiplying circuit 733 from a coefficient-generating circuit 76, described below, to be multiplied by the value ($d_{m+1}-d_m$). The result $KL(d_{m+1}-d_m)$ and the data $d_m$ from the converting circuit 731 are supplied to the adding circuit 734.

The adding circuit 734 outputs the image data dOUT represented by the following expression:

$$KL(d_{m+1} - d_m) + d_m = (1 - KL)d_m + KL \cdot d_{m+1} \quad (3)$$
$$= dOUT$$

That is, the image data dOUT after line conversion is obtained for the n-th frame. This image data dOUT is used as image data $D_n$ of the n-th frame in expression (1), and is hereinafter replaced by image data $D_n$ (after line conversion).

The structure of the line-interpolating circuit 74 is similar to that of the line-interpolating circuit 73, except that the converting circuit 741 synchronously outputs image data $d_m$ of the m-th line and image data $d_{m+1}$ of the (m+1)-th line in the (n+1)-th frame, out of the original image data read out from the memory 16.

Thus, the adding circuit 744 in the line-interpolating circuit 74 outputs the image data dOUT after line conversion for the (n+1)-th frame. This image data dOUT follows the image data $D_n$ (=dOUT) output from the line-interpolating circuit 73, and thus is image data $D_{n+1}$ (after line conversion) of the (n+1)-th frame in expression (1). Accordingly, image data of two continuous frames after line conversion are synchronously output from the line-interpolating circuits 73 and 74.

These image data $D_n$ and $D_{n+1}$ after line conversion are supplied to a frame-interpolating circuit 75 provided in the display signal-processing circuit 17. The frame-interpolating circuit 75 converts frames of the image data $D_n$ and $D_{n+1}$ after line conversion into those of the output image data by interpolation according to expression (1).

The image data $D_n$ and $D_{n+1}$ after line conversion are supplied to a subtracting circuit 752 that subtracts the data $D_n$ from the data $D_{n+1}$ and supplies the result $(D_{n+1}-D_n)$ to a multiplying circuit 753. The coefficient KF is also supplied to the multiplying circuit 753 from a coefficient-generating circuit 77, described below, to be multiplied by the value $(D_{n+1}-D_n)$. The result $KF(D_{n+1}-D_n)$ and the data $D_n$ from the line-interpolating circuit 73 are supplied to an adding circuit 754.

The adding circuit 754 outputs the image data DOUT represented by the following expression:

$$KF(D_{n+1} - D_n) + D_n = (1 - KF)D_n + KF \cdot D_{n+1} \quad (4)$$
$$= DOUT$$

That is, the image data DOUT after frame conversion and line conversion is obtained.

This image data DOUT is D/A-converted to analog color video signals to be output to the external video output terminal 19. Thus, images are displayed, in the PAL format, on a monitoring television receiver connected to the external video output terminal 19.

(4) Coefficient-Generating Circuits 76 and 77

Figure 6:
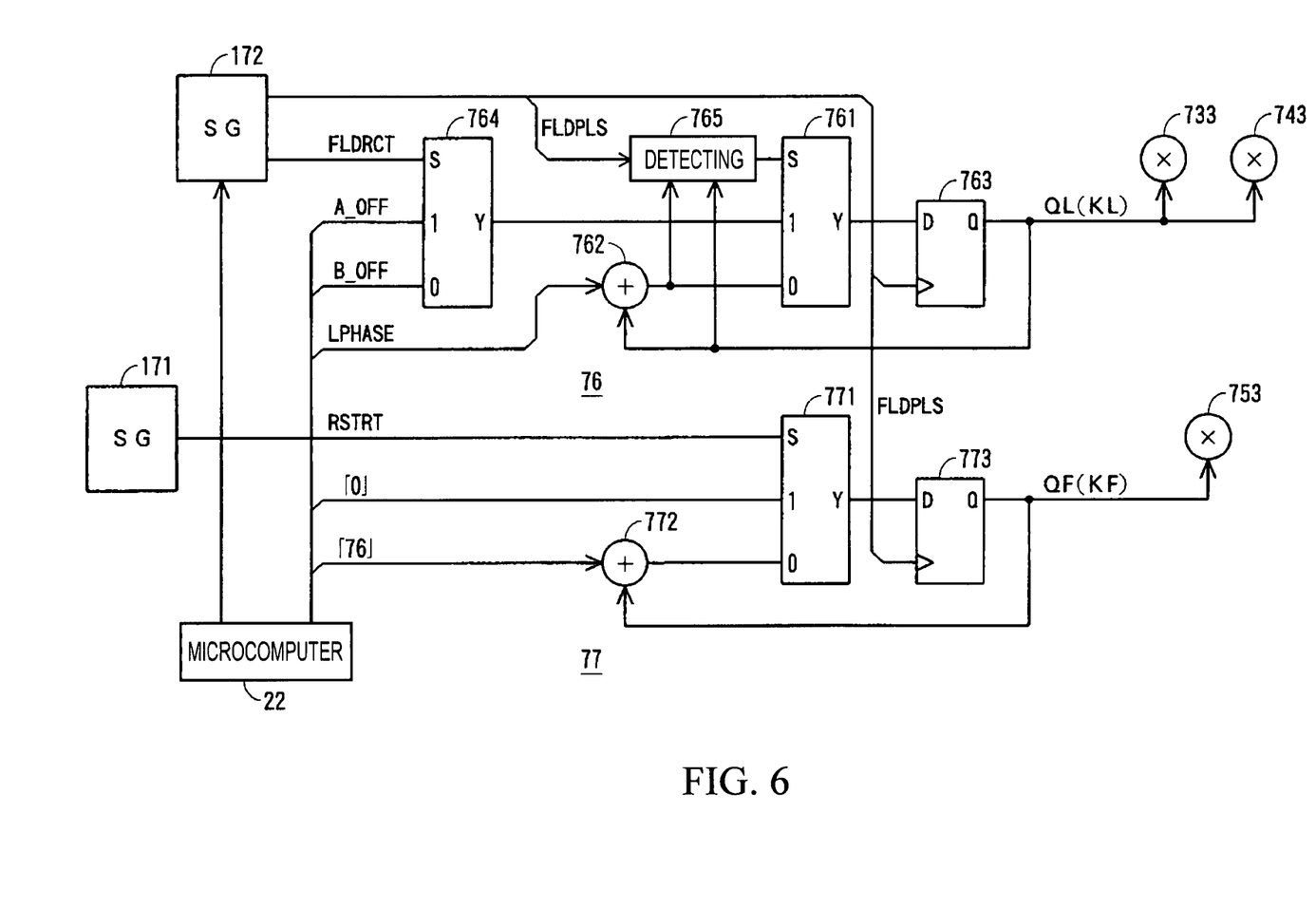
FIG. 6 is a schematic diagram illustrating a part of the present invention.

As described above, the coefficient-generating circuit 76 generates the coefficient KL for line conversion, and the coefficient-generating circuit 77 generates the coefficient KF for frame conversion. For example, the main part of the coefficient-generating circuit 76 may be similar to that of the coefficient-generating circuit 77, as shown in FIG. 6. Since the structure and operation of the coefficient-generating circuit 77 for frame conversion are simple, first the coefficient-generating circuit 77 will now be described.

(4-1) Coefficient-Generating Circuit 77

The coefficient-generating circuit 77 generates the coefficient KF, which changes according to the shift between the NTSC frame and the PAL frame. In this case, when output image data in the PAL format is formed based on image data after line conversion, the time resolution of the output image data is 1/128 of the field period of the PAL format.

The coefficient-generating circuit 77 includes a data selector 771 that changes the initial value and the delta value, an adding circuit 772 for accumulation, and a 7-bit register (a latch circuit) 773 that stores the accumulated value. The microcomputer 22 outputs, for example, 0 and 76 as the initial value and the delta value, respectively, to the data selector 771 and the adding circuit 772. The signal-generating circuit 171 outputs the pulses RSTRT to the data selector 771 as control signals.

When RSTRT=1, the initial value 0 is output from the data selector 771 and the register 773 stores the output initial value 0 upon receiving the pulse FLDPLS from the signal-generating circuit 172. Thus, as shown in part H of FIG. 4, an output QF from the register 773 is 0 for one period (the period of the field 1A) after the pulse RSTRT is sent. Simultaneously, the output QF (=0) from the register 773 and the delta value 76 from the microcomputer 22 are summed up in the adding circuit 772, and the summed-up value 76 is output from the adding circuit 772.

Subsequently, the value of RSTRT is 0. When one field period has elapsed since the value of RSTRT is 0 (at the beginning of the period of the field 1B), RSTRT=0. Thus, the current value 76 of the output from the adding circuit 772 is supplied to the register 773 through the data selector 771, and the register 773 stores the value 76 upon receiving the pulse FLDPLS. As shown in part H of FIG. 4, QF=76 from this point of time. Accordingly, the output from the adding circuit 772 is 152.

When a further field period of the PAL format has elapsed, the output 152 from the adding circuit 772 is supplied to the register 773 through the data selector 771 and the register 773 stores the value 152 upon receiving the pulse FLDPLS. However, since the register 773 is a 7-bit register, only the lower 7 bits of the output 152 from the adding circuit 772 are latched into the register 773. As shown in part H of FIG. 4, the output QF from the register 773 is 24 (=152−128).

The above operation is repeated every field period of the PAL format, so that the output QF from the register 773 changes every field period of the PAL format, as shown in part H of FIG. 4. This output QF is shifted toward the least significant bit (LSB) by seven bits to be the value QF/128. This value is supplied to the multiplying circuit 753 in the frame-interpolating circuit 75 as the coefficient KF. Multiplying both sides of expression (1) by 128 results in:

$$128 \times DOUT = 128 \times (1 - KF)D_n + 128 \times KF \times D_{n+1} \quad (5)$$
$$= (128 - QF)D_n + QF \cdot D_{n+1}$$

Thus, since QF=0 (KF=0) for the period of the odd field 1A in the first frame of the output image data, image data of the odd field 1A is formed by mixing the odd field in the first frame and the odd field in the second frame of the image data after line conversion in the ratio of 128:0, as shown in part I of FIG. 4. Since QF=76 (KF=76/128) for the period of the even field 1B in the first frame of the output image data, image data of the even field 1B is formed by mixing the even field in the first frame and the even field in the second frame of the image data after line conversion in the ratio of 52:76.

Furthermore, since QF=24 (KF=24/128) for the period of the odd field 2A in the second frame of the output image data, image data of the odd field 2A is formed by mixing the odd field in the second frame and the odd field in the third frame of the image data after line conversion in the ratio of 104:24. Since QF=100 (KF=100/128) for the period of the even field 2B in the second frame of the output image data, image data of the even field 2B is formed by mixing the even field in the second frame and the even field in the third frame of the image data after line conversion in the ratio of 28:100.

Continuously, image data of fields of two continuous frames of the image data after line conversion are mixed at a certain ratio shown in part I of FIG. 4 every field period of the PAL format to form the output image data DOUT (the output video signals) in the same way.

Thus, even when the image data after line conversion is formed every frame period of the NTSC format, image data of each field in the PAL format is formed by interpolation. Since this formed image data is the output image data DOUT, the jerkiness of the captured moving images is improved to smooth the motion of the moving images.

When the output image data DOUT in the NTSC format is formed, the microcomputer 22 controls the signal-generating circuit 172 so as to set the period of the pulses FLDPLS and the period of the signals FLDRCT to the NTSC field period. The microcomputer 22 outputs, for example, 32 and 64 as the initial value and the delta value, respectively, to the data selector 771 and the adding circuit 772. The value KL may be set to 0.

In this case, since the output QF from the coefficient-generating circuit 77 alternately changes to 32 or 96 every field period of the NTSC format, the coefficient KF, which is the mixing ratio in the frame-interpolating circuit 75, alternately changes to ¼ or ¾ every field period of the NTSC format. Thus, the process is as shown in FIG. 2, so that smooth moving images can be displayed when the output image data DOUT in the NTSC format is formed.

(4-2) Coefficient-Generating Circuit 76

The coefficient KL generated by the coefficient-generating circuit 76 is used for mixing two continuous lines of image data at, for example, the ratios shown in FIG. 3. Thus, as shown in FIG. 6, the structure of the coefficient-generating circuit 76 is basically the same as that of the coefficient-generating circuit 77.

That is, the coefficient-generating circuit 76 includes a data selector 761, an adding circuit 762, and a register 763, respectively corresponding to the data selector 771, the adding circuit 772, and the register 773 in the coefficient-generating circuit 77. The coefficient-generating circuit 76 also includes a data selector 764 and a detecting circuit 765. The detecting circuit 765 is supplied with the pulses FLDPLS, a summed output from the adding circuit 762, and an output QL from the register 763. The detecting circuit 765 detects the start point of each field period, which is the field period of the PAL format in this case, in output image data, and supplies the detection output to the data selector 761 as control signals.

To adjust the positions of horizontal lines of the odd field and the even field in the output image, the microcomputer 22 outputs the initial value A_OFF for adjusting the odd field and the initial value B_OFF for adjusting the even field. The initial value A_OFF corresponds to the mixing ratio of 1:11 for mixing the first line and the second line in FIG. 3 and Process (A) described above, and the initial value B_OFF corresponds to the mixing ratio of 3:9 for mixing the second line and the third line in FIG. 3 and Process (B) described above.

The data selector 764 is supplied with these initial values A_OFF and B_OFF and the rectangular-wave signals FLDRCT from the signal-generating circuit 172 as control signals, and alternately outputs the initial values A_OFF and B_OFF every field period, each of these initial values corresponding to this field period.

The output initial value A_OFF or B_OFF is supplied to the data selector 761. The microcomputer 22 outputs the delta value LPHASE to the adding circuit 762. The delta value LPHASE corresponds to the delta value 2/11 of the mixing ratio shown in FIG. 3. The signal-generating circuit 172 supplies a predetermined latch pulse to the register 763 at the start point of every horizontal line period of the output image data.

Thus, the output QL from the register 763 is set to the initial value A_OFF or the initial value B_OFF at the start point of every field period of the output image data. Subsequently, the output QL changes to the value obtained by adding the delta value LPHASE to the initial value every horizontal line period, as shown in FIG. 3. The output QL is supplied as the coefficient KL to the multiplying circuit 733 in the line-interpolating circuit 73 and the multiplying circuit 743 in the line-interpolating circuit 74, where line conversion is carried out.

(5) Add-Up

When frames of image data in the NTSC format are converted into those in the PAL format, the above digital still camera forms image data of a field in the PAL format by interpolating the mean value of the image data values of two fields in the NTSC format that are close to the field in the PAL format in the chronological sequence of the conversion process. The digital still camera then outputs this formed image data as display signals. Thus, smooth moving images can be displayed.

When lines in the NTSC format are converted to those in the PAL format, image data of a line in the PAL format is formed by interpolating the mean value of the image data values of two lines in the NTSC format that are spatially close to the line in the PAL format. Thus, high quality images without nonuniformity in lines on a display screen can be achieved.

As shown in FIGS. 3 and 4, when two frames of original image data are obtained, line conversion and frame conversion can be carried out. Thus, the delay of image data due to line conversion and frame conversion is about two frame periods, thereby suppressing the delay of output image data and reducing the memory requirements.

In the above embodiment, image data having other horizontal line frequencies and frame frequencies can be converted by changing the line conversion coefficient KL and the frame conversion coefficient KF.

According to the present invention, lines and frames of image data in the NTSC format are converted to those in the PAL format by interpolating the mean value spatially and chronologically. Thus, smooth and high quality moving images can be achieved. Furthermore, the delay of image data due to line conversion and frame conversion is about two frame periods, thereby suppressing the delay of output image data and reducing the memory requirements.

The invention claimed is:

1. A method for converting image data in a first format into image data in a second format, the image data in the first format having a first frame frequency and a first line frequency, the image data in the second format having a second frame frequency and a second line frequency, the method comprising the steps of:

retrieving respective image data required for producing the image data in the second format of an odd field and an even field, out of moving image data in the first format from a memory to which the moving image data in the first format is written, every odd field period and every even field period in the second format, respectively;

converting retrieved image data into first image data and second image data, both the first and second image data having the second line frequency;

outputting the image data of the odd field in the second format by mixing image data of an odd field of the first image data and image data of an odd field of the second image data at a first predetermined mixing ratio;

outputting the image data of the even field in the second format by mixing image data of an even field of the first image data and image data of an even field of the second image data at a second predetermined mixing ratio; and changing the first and second predetermined mixing ratios every field period in the second format.

2. The method for converting image data according to claim 1, wherein the first format is the National Television System Committee (NTSC) format; and the second format is the Phase Alternation by Line (PAL) format.

3. The method for converting image data according to claim 1, wherein the first format is the NTSC format; and the second format is switched to the NTSC format or the PAL format.

4. A converting circuit for converting image data in a first format into image data in a second format, the image data in the first format having a first frame frequency and a first line frequency, the image data in the second format having a second frame frequency and a second line frequency, the converting circuit comprising:

a memory to which moving image data in the first format is written;

a first circuit retrieving respective image data required for producing the image data in the second format of an odd field and an even field, out of the moving image data in the first format from the memory, every odd field period and every even field period in the second format, respectively;

a second circuit converting retrieved image data into first image data and second image data, both the first and second image data having the second line frequency;

a third circuit outputting the image data of the odd field in the second format by mixing image data of an odd field of the first image data and image data of an odd field of the second image data at a first predetermined mixing ratio, and outputting the image data of the even field in the second format by mixing image data of an even field of the first image data and image data of an even field of the second image data at a second predetermined mixing ratio; and a fourth circuit changing the first and second predetermined mixing ratios every field period in the second format.

5. The converting circuit according to claim 4, wherein the first format is the NTSC format; and the second format is the PAL format.

6. The converting circuit according to claim 4, further comprising:

a circuit in which the second format is switched to the NTSC format or the PAL format, wherein the first format is the NTSC format.

7. An electronic camera wherein image data in a first format has a first frame frequency and a first line frequency and image data in a second format has a second frame frequency and a second line frequency, the electronic camera comprising:

an image sensor, onto which an image of an object is projected, outputting the image data in the first format every frame period of the first format;

a memory to which the image data in the first format output from the image sensor is written;

a first circuit retrieving respective image data required for producing the image data in the second format of an odd field and an even field, out of the image data in the first format from the memory, every odd field period and every even field period in the second format, respectively;

a second circuit converting retrieved image data into first image data and second image data, both the first and second image data having the second line frequency;

a third circuit outputting the image data of the odd field in the second format by mixing image data of an odd field of the first image data and image data of an odd field of the second image data at a first predetermined mixing ratio, and outputting the image data of the even field in the second format by mixing image data of an even field of the first image data and image data of an even field of the second image data at a second predetermined mixing ratio;

a fourth circuit changing the first and second predetermined mixing ratios every field period in the second format; and an external terminal outputting the image data output from the third circuit.

8. The electronic camera according to claim 7, further comprising:

a circuit in which the second format is switched to the NTSC format or the PAL format, wherein the first format is the NTSC format.

* * * * *